(12) United States Patent
Rabe et al.

(10) Patent No.: US 12,188,107 B2
(45) Date of Patent: Jan. 7, 2025

(54) METHOD OF LITHIUM EXTRACTION FROM SEDIMENTARY CLAY

(71) Applicant: Lithium Nevada Corp., Reno, NV (US)

(72) Inventors: Brett A. Rabe, Reno, NV (US); Ryan M. Ravenelle, Reno, NV (US); Rene Leblanc, Reno, NV (US)

(73) Assignee: Lithium Nevada Corp., Reno, NV (US)

( * ) Notice: Subject to any disclaimer, the term of this patent is extended or adjusted under 35 U.S.C. 154(b) by 517 days.

(21) Appl. No.: 17/442,961

(22) PCT Filed: Mar. 23, 2020

(86) PCT No.: PCT/US2020/024152
§ 371 (c)(1),
(2) Date: Sep. 24, 2021

(87) PCT Pub. No.: WO2020/205302
PCT Pub. Date: Oct. 8, 2020

(65) Prior Publication Data
US 2022/0220578 A1 Jul. 14, 2022

Related U.S. Application Data

(60) Provisional application No. 62/826,107, filed on Mar. 29, 2019.

(51) Int. Cl.
*C22B 26/12* (2006.01)
*C22B 3/08* (2006.01)
(Continued)

(52) U.S. Cl.
CPC .............. *C22B 26/12* (2013.01); *C22B 3/08* (2013.01); *C22B 3/42* (2013.01); *C22B 26/22* (2013.01)

(58) Field of Classification Search
CPC ............ C22B 26/22; C22B 3/08; C22B 26/12
See application file for complete search history.

(56) References Cited

U.S. PATENT DOCUMENTS

| 2,516,109 A | 7/1950 | Ellestad et al. |
| 2,608,465 A | 8/1952 | Henderson |

(Continued)

FOREIGN PATENT DOCUMENTS

| CA | 3014623 | 8/2017 |
| CL | 33867 | 7/1983 |

(Continued)

OTHER PUBLICATIONS

Rabe, Brett; Office Action for Chinese application No. 202080034650.1, filed Mar. 23, 2020, mailed Jul. 22, 2023, 15 pgs.

(Continued)

*Primary Examiner* — Anthony J Zimmer
*Assistant Examiner* — Eric Scott Sherman
(74) *Attorney, Agent, or Firm* — Buchalter (57) ABSTRACT

A method of extracting purified lithium sulfate brine from sedimentary rock is disclosed. The method includes the steps of sizing sedimentary rock ore, suspending the sized ore in an aqueous solution, and separating the aqueous solution into lithium bearing slurry and low lithium gangue. The lithium bearing slurry is then treated with an acid, dissolving lithium from the sedimentary rock and forming precipitates which are subsequently removed the slurry, forming an acidic lithium sulfate filtrate solution. The pH of the acidic lithium sulfate filtrate solution is then modified to form further precipitates which are then separated. The neutralized lithium sulfate solution is then crystallized to remove magnesium and potassium, and treated with quicklime, soda ash solution, and/or oxalic acid to form additional precipitates. Finally the additional precipitates are separated from (Continued)

the solution, and the solution is passed through an ion exchange apparatus, forming a purified lithium sulfate brine.

16 Claims, 5 Drawing Sheets

(51) Int. Cl.
  *C22B 3/42* (2006.01)
  *C22B 26/22* (2006.01)

(56) References Cited

U.S. PATENT DOCUMENTS

| | | | |
|---|---|---|---|
| 2,801,153 | A | 7/1957 | Dwyer |
| 2,923,600 | A | 2/1960 | Maurice et al. |
| 2,972,517 | A | 2/1961 | MacEwan |
| 3,007,770 | A | 11/1961 | Kawecki et al. |
| 3,649,219 | A | 3/1972 | Lynn et al. |
| 3,793,433 | A | 2/1974 | Seeley et al. |
| 4,287,163 | A | 9/1981 | Garrett et al. |
| 4,587,106 | A | 5/1986 | Bauer et al. |
| 5,682,593 | A | 10/1997 | Holzner et al. |
| 8,431,005 | B1 | 4/2013 | Zbranek et al. |
| 8,444,744 | B2 | 5/2013 | Narisako et al. |
| 8,936,711 | B2 | 1/2015 | Chon et al. |
| 9,034,294 | B1 | 5/2015 | Harrison |
| 9,147,918 | B2 | 9/2015 | Ueda |
| 9,187,804 | B2 | 11/2015 | Ishida et al. |
| 9,410,227 | B2 | 8/2016 | Boudreault et al. |
| 9,677,152 | B2 | 6/2017 | Asano et al. |
| 9,677,153 | B2 | 6/2017 | Wohlgemuth et al. |
| 9,725,787 | B2 | 8/2017 | Laitala et al. |
| 9,926,618 | B2 | 3/2018 | Li et al. |
| 9,963,760 | B2 | 5/2018 | Hu et al. |
| 9,994,931 | B2 | 6/2018 | Chon et al. |
| 10,865,462 | B2 | 12/2020 | Ito et al. |
| 10,894,997 | B2 | 1/2021 | Johnson et al. |
| 10,975,478 | B2 | 4/2021 | Lipp et al. |
| 11,066,356 | B2 | 7/2021 | De Souza et al. |
| 11,247,189 | B2 | 2/2022 | Riabtsev et al. |
| 11,339,481 | B1 | 5/2022 | Ehren |
| 2002/0127173 | A1 | 9/2002 | Bulan et al. |
| 2011/0066356 | A1 | 3/2011 | Ogura |
| 2019/0185963 | A1* | 6/2019 | Johnson ............... C22B 3/44 |
| 2019/0330712 | A1 | 10/2019 | Wang |
| 2019/0379088 | A1 | 12/2019 | Schmidt et al. |
| 2020/0010334 | A1 | 1/2020 | Pellenbarg et al. |
| 2020/0044295 | A1 | 2/2020 | Arakawa et al. |
| 2020/0048733 | A1 | 2/2020 | Moya et al. |
| 2020/0048736 | A1 | 2/2020 | Dixon et al. |
| 2020/0165699 | A1 | 5/2020 | Snydacker et al. |
| 2020/0239981 | A1 | 7/2020 | Ariyoshi et al. |
| 2020/0346137 | A1 | 11/2020 | Palsdottir et al. |
| 2020/0392602 | A1 | 12/2020 | Xu |
| 2020/0399735 | A1 | 12/2020 | Sams et al. |
| 2020/0399737 | A1 | 12/2020 | Tran et al. |
| 2021/0108285 | A1 | 4/2021 | Arakawa |
| 2021/0108286 | A1 | 4/2021 | Arakawa et al. |
| 2021/0130927 | A1 | 5/2021 | Bender et al. |
| 2021/0172041 | A1 | 6/2021 | Duyvesteyn |
| 2021/0214254 | A1 | 7/2021 | De Souza et al. |
| 2021/0246529 | A1 | 8/2021 | Jariwala et al. |
| 2021/0265678 | A1 | 8/2021 | Azimi et al. |
| 2022/0380917 | A1 | 12/2022 | Dara |
| 2023/0313338 | A1* | 10/2023 | Grande Villarino ... C01D 15/02 423/179.5 |
| 2024/0240280 | A1 | 7/2024 | Ravenelle et al. |

FOREIGN PATENT DOCUMENTS

| | | |
|---|---|---|
| CL | 201801689 | 7/2018 |
| CL | 201900483 | 8/2019 |
| CN | 100503849 | 6/2009 |
| CN | 102041380 B | 11/2011 |
| CN | 103849761 | 6/2014 |
| JP | 2019508587 | 3/2019 |
| KR | 101158527 | 1/2012 |
| WO | 2017200408 | 11/2017 |
| WO | 2020205302 | 10/2020 |
| WO | 2024155455 | 7/2024 |

OTHER PUBLICATIONS

Rabe, Brett; Examination Report for Chile application No. 2442-2021, filed Mar. 23, 2020, mailed Jun. 22, 2023, 23 pgs.
Rabe, Brett; Office Action for Chinese application No. 202080034650.1, filed Mar. 23, 2020, mailed Jan. 18, 2023, 29 pgs.
Bertau, et al.; Article entitled: "Lithium Recovery from Challenging Deposits: Zinnwaldite and Magnesium-Rich Salt Lake Brines", Chembioeng Reviews, vol. 4, No. 6, Jan. 1, 2017, pp. 360-375, 17 pgs.
Rabe, Brett; Extended European Search report for application No. 20784373.1, filed Mar. 23, 2020, mailed Apr. 12, 2023, 78 pgs.
Bertau, et al.; "Lithium Recovery from Challenging Deposits: Zinnwaldite and Magnesium-Rich Salt Lake Brines," ChemBioEng Reviews 4.6 (Aug. 24, 2017): 360-376.
Rabe, Brett A.; International Preliminary Report on Patentability for PCT/US20/24152, filed Mar. 23, 2020, mailed Oct. 14, 2021, 7 pgs.
Rabe, Brett A.; International Search Report and Written Opinion for PCT/US20/24152, filed Mar. 23, 2020, mailed Jun. 17, 2020, 7 pgs.
Hano, et al.; Article entitled: "Solvent Extraction and Ion Exchange", Department of Environment Chemistry and Engineering, Oita University, Oita, 870-11, Japan, published Jun. 25, 2007, 14 pgs.
Masmoudia, et al.; Article entitled: "Solvent extraction of lithium ions using benzoyltrifluoroacetone in new solvents", HAL archives-ouvertes, Dec. 7, 2020, 21 pgs.
Nguyen, et al.; Article entitled: "A Review on the Separation of Lithium Ion from Leach Liquors of Primary and Secondary Resources by Solvent Extraction with Commercial Extractants", Processes 2018, published May 12, 2018, 15 pgs.
Stringfellow, et al.; Article entitled: "Technology for Lithium Extraction in the Context of Hybrid Geothermal Power", Proceedings, 46th Workshop on Geothermal Reservoir Engineering, Stanford University, Stanford, California, Feb. 15-17, 2021, 20 pgs.
Zhang, et al.; Article entitled: "Recovery of lithium from alkaline brine by solvent extraction with B-diketone", Hydrometallurgy 174 (2018) 35-42, 8 pgs.
Rabe, Brett; Examination Report for Chile application No. 2442-2021, filed Mar. 23, 2020, mailed Dec. 7, 2023, 21 pgs.
Rabe, Brett; Office Action for Canadian patent application No. 3,134,664, filed Mar. 23, 2020, mailed Dec. 1, 2023, 5 pgs.
Ravenelle, Ryan Michael; International Search Report and Written Opinion for PCT Application No. PCT/US24/10415, filed Jan. 5, 2024, mailed May 30, 2024, 14 pgs.
Garrett D., "Handbook of Lithium and Natural Calcium", Academic Press, 2004, located at <https://books.google.com/books?is=Ua2SVcUBHZgC&printsec=frontcover#v=onepage&q&f=false?>, p. 1.

* cited by examiner

METHOD OF LITHIUM EXTRACTION FROM SEDIMENTARY CLAY

FIELD OF THE INVENTION

This invention relates to the extraction and subsequent concentration of lithium from sedimentary clay. Specifically, this invention relates to a method of extracting and subsequent concentration of lithium from sedimentary rock contained within sedimentary clay.

BACKGROUND OF THE INVENTION

Lithium and lithium compounds are vital components in industries such as energy storage, ceramics, electronics, lubrication, and metallurgy. While terrestrial sources of lithium are widespread, it is nonetheless difficult to obtain lithium in appreciable quantities. As described in the *Handbook of Lithium and Natural Calcium*, "Lithium is a comparatively rare element, although it is found in many rocks and some brines, hut always in very low concentrations. There are a fairly large number of both lithium mineral and brine deposits but only comparatively few of them are of actual or potential commercial value. Many are very small, others are too low in grade." Garrett Donald (2004) *Handbook of Lithium and Natural Calcium*, Academic Press.

Given this, there have been many attempts to extract lithium from different sources in efficient and economical ways. For example, U.S. Pat. No. 2,608,465 describes a method of extracting lithium sulfate from lithium phosphate deposits. Similarly U.S. Pat. Nos. 2,516,109; 2,801,153; 2,923,600; 2,972,517; and 3,007,770 describe methods of extracting lithium carbonate or lithium hydroxide from spodumene ores. Separately WO2017200408 and CN102041380 disclose methods of extracting lithium from lepidolite ore.

Sedimentary clays are another source of appreciable amounts of lithium. Also known as secondary clays, sedimentary clays have been displaced and eroded by movements of the earth over geologic time scales. Embedded within sedimentary clays are sedimentary rocks containing detrital material and minerals such as clay minerals, zeolites, calcite, quartz, feldspar, plagioclase, dolomite, and fluorite. In particular, it has been found that clay minerals such as smectite and illite contain appreciable amounts of lithium.

To date, there does not appear to be any widely used method of extracting lithium from sedimentary clays. While CN103849761A discloses a method of lithium extraction from clays, the method still relies on costly and rate limiting pyrometallurgical processes similar to those used in processing of silicate ores such as spodumene. What is needed is an economical, efficient way to extract lithium from sedimentary clays.

SUMMARY OF THE INVENTION

In accordance with one aspect of the invention, there is provided a method of extracting lithium from sedimentary rock to produce lithium sulfate brine. The method includes the steps of sizing sedimentary rock, suspending the sized sedimentary rock in an aqueous solution, and separating the aqueous solution into lithium bearing slurry and low lithium containing coarse gangue. The lithium bearing slurry is then treated with an acid, dissolving lithium from the sedimentary rock and forming first precipitates, and the first precipitates are separated from the lithium bearing slurry, forming an acidic lithium sulfate solution. The pH of the acidic lithium sulfate solution is then modified to a pH of between approximately 4 and approximately 8, resulting in the formation of second precipitates, which are then separated from the neutralized lithium sulfate solution.

The neutralized lithium sulfate solution is then crystallized, forming magnesium sulfate crystals and magnesium-potassium sulfate crystals which are also separated, resulting in a neutralized lithium sulfate mother liquor. The neutralized lithium sulfate mother liquor is then treated with calcium hydroxide or quicklime (calcium oxide), soda ash, and oxalic acid forming third precipitates that are then separated from the liquor and recycled to the neutralization step. Finally, the resultant magnesium-free lithium sulfate mother liquor is processed through multiple resin beds to further remove contaminants via ion exchange, forming a purified lithium sulfate brine solution. The lithium sulfate brine may subsequently be processed into lithium carbonate or lithium hydroxide monohydrate.

In a preferred embodiment, the aqueous sedimentary rock is separated into lithium bearing slurry and gangue through the use of an attrition scrubber. Separately, the lithium slurry is preferably treated with sulfuric acid in segmented attack tank reactors. Precipitates formed in the attack tank reactors, as well as any undissolved solids, are preferably removed via pressure filtration. It has been determined that by using the above method, lithium sulfate brine can be extracted efficiently and economically from sedimentary clays.

DETAILED DESCRIPTION OF THE PREFERRED EMBODIMENTS

The disclosed invention covers a method of extracting and concentrating lithium from sedimentary rock. The method includes the steps of sizing sedimentary rock, suspending the sized sedimentary rock in an aqueous solution, and separating the aqueous solution into lithium bearing slurry and gangue. The lithium bearing slurry is then treated with an acid, dissolving lithium from the sedimentary rock and forming first precipitates. The first precipitates are separated from the lithium bearing slurry, forming an acidic lithium sulfate solution. The pH of the acidic lithium sulfate solution is then modified to a pH between approximately 4 and approximately 8, resulting in the formation of second precipitates, which are then separated from the neutralized lithium sulfate solution.

The neutralized lithium sulfate solution is then crystallized, forming magnesium sulfate crystals and magnesium-potassium sulfate crystals which are separated from the solution, resulting in a neutralized lithium sulfate mother liquor. The neutralized lithium sulfate mother liquor is then treated with calcium hydroxide or quicklime (CaO), soda ash, and oxalic acid, forming third precipitates that are then separated from the lithium sulfate mother liquor, forming a magnesium-free lithium sulfate solution. The third precipitates, alkaline in nature, are recycled in the process and used to neutralize acidic lithium sulfate solution. Finally, the magnesium-free lithium sulfate solution is processed through multiple resin beds to further remove contaminants via ion exchange, forming a purified lithium sulfate brine solution that can be used to produce lithium carbonate or lithium hydroxide monohydrate.

Mining

The disclosed invention contemplates the extraction of lithium ore from various types of sedimentary rock. The method of extraction is not critical to the invention and can be accomplished through known methods in the art, such as methods used in the phosphate, coal, or clay industries whereby ore is slurried and classified to remove gangue. In one embodiment, the ore is extracted from sedimentary rock containing detrital material and several minerals typical of sedimentary basins, including clay minerals (illite, smectite, etc.) and zeolites. Preferably, the ore is extracted from sedimentary rock containing 100 ppm to 20,000 ppm lithium. More preferably, the ore is extracted from smectite/hectorite clay with a concentration greater than 2,000 ppm lithium. Most preferably, the mined ore is extracted from sedimentary rock containing an illite-type clay with a concentration of greater than 8,000 ppm lithium.

Ore Preparation

Figure 1:
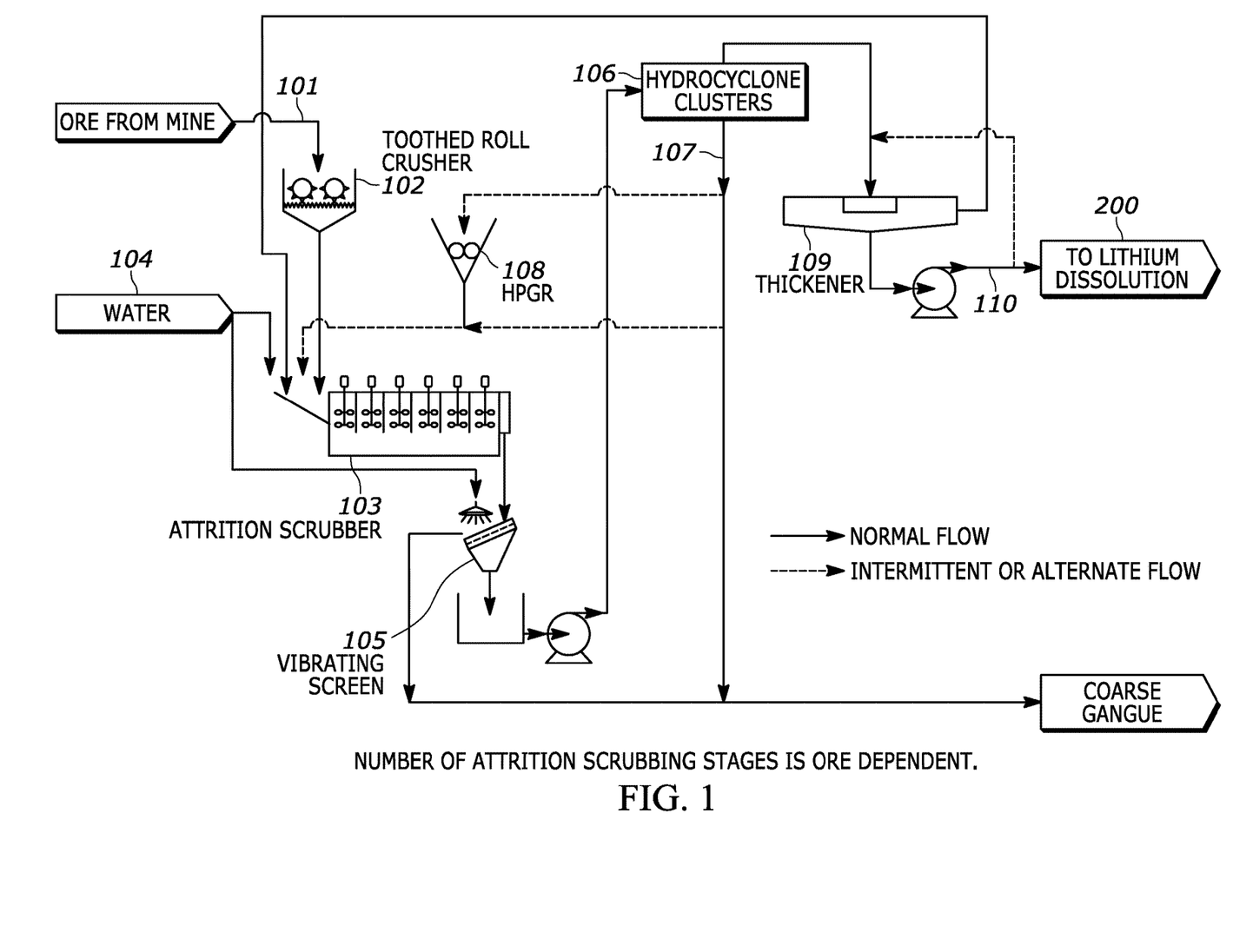
FIG. 1 is a flow chart depicting one method of preparing sedimentary rock for lithium extraction in accordance with one aspect of the invention.

A preferred process for ore preparation is depicted in FIG. 1. After the sedimentary rock ore 101 is extracted, it is further processed to a smaller size to ensure efficient operation during subsequent processing. The sedimentary rock is preferably sized to a top size of 150 mm, more preferably 100 mm, and most preferably 50 mm. Sizing is accomplished through the use of a toothed-roll crusher 102. Other sizing devices known in the art, such as cone crushers, impact crushers, or high-pressure grinding rolls (HPGR) may also be utilized. Crusher selection and/or operation should minimize the production of material less than 10 mm.

Once the sedimentary rock ore 101 is appropriately sized, the material is fed to an attrition scrubber 103. An attrition scrubber is an agitated vessel whereby water 104 is added to the sized sedimentary rock ore 101, forming a slurry. A high-speed agitator causes slurry particles to impact one another, thereby creating a scrubbing effect between particles. The disclosed invention not only uses an attrition scrubber to scrub lithium bearing particles from larger non-lithium bearing particles, but it also uses an attrition scrubber for particle comminution. By exploiting differences in breakage characteristics between lithium and low lithium bearing particles, the attrition scrubber reduces lithium bearing particles to a size fraction less than approximately 100 microns, while harder low lithium bearing particles remain in a size fraction larger than approximately 100 microns. The attrition scrubber is tuned to maximize size reduction of lithium bearing particles by controlling slurry wt. % solids, retention time, and agitator tip speed, which may vary for different ore types and lithium concentrations. Slurry wt. % solids ranges from 10 wt. % to 40 wt. %, retention time ranges from 5 minutes to 30 minutes, and agitator tip speed ranges from 200 to 2,000 feet per minute. The amount of stages contained in the attrition scrubber 103 is dependent on the characteristics of the sized sedimentary rock ore 101 being processed.

As the sedimentary rock is processed through the attrition scrubber, the rock is reduced to a water-based slurry containing lithium bearing fine particles and low lithium containing coarse gangue particles. The gangue is then separated from the slurry through classification methods known in the art such as wet screening and hydrocycloning. Classification by wet screening is preferably accomplished through the use of one or more vibrating screens 105, whereas classification by hydrocycloning is accomplished through one or more stages using a hydrocyclone cluster 106 comprising one or more hydrocyclones. Preferably, hydrocyclone clusters 106 are configured to separate gangue coarser than 100 microns from smaller lithium bearing particles but may be configured to separate particles as small as 30 microns. The hydrocyclone underflow containing the coarse gangue from the final stage of classification is then discarded or stored in a tailings or waste rock storage area 107.

In the event that lithium bearing sedimentary clay is still present in the gangue, the coarse gangue can be recycled back to the attrition scrubber or sent to a regrind or crushing circuit utilizing size reduction equipment to liberate the softer sedimentary clay from the coarse gangue. The regrind or crushing equipment could include equipment known in the art such as high-pressure grinding rolls (HPGR) 108, impact crushers, autogeneous grinding mills, or semi-autogenous grinding mills. Following size reduction, the coarse gangue is returned to the attrition scrubber 103. The hydrocyclone overflow containing the lithium bearing slurry is thickened in a standard process thickener or paste thickener 109 with flocculating and coagulating polymers to 20 wt. % to 55 wt % solids. Preferably, the flocculants are anionic polyacrylamides, while the coagulants are organic polyamines. The resulting thickened ore slurry 110 is then sent to the lithium dissolution circuit 200, while the overflow from the thickener 109 is recycled back to the attrition scrubber 103 to slurry new ore.

Lithium Dissolution Circuit

Figure 2:
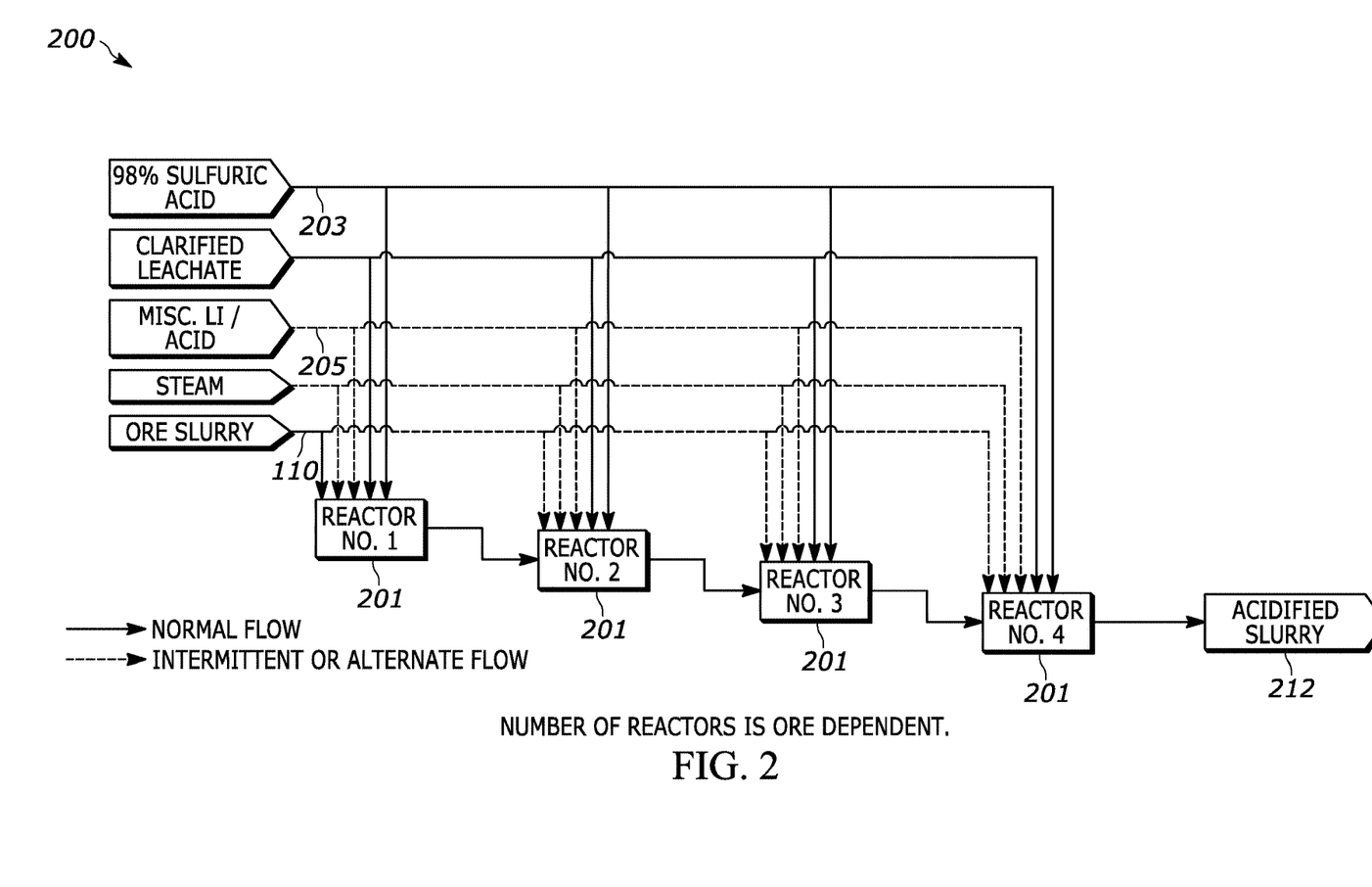
FIG. 2. is a flow chart depicting one method of dissolving lithium in the lithium bearing slurry in accordance with one aspect of the invention.

A flow chart depicting the lithium dissolution circuit 200 is shown in FIG. 2. The ore slurry 110 is first added to a series of attack tank reactors 201. An attack tank reactor is an agitated vessel designed to control a chemical reaction between concentrated sulfuric acid and lithium bearing sedimentary ore slurry with the purpose of dissolving lithium from the sedimentary ore. The attack tank reactors 201 are segmented, and the slurry is passed from one segmented section to the next. Throughout this process, sulfuric acid 203 is added to the attack tank circuit and recycled among the segments to maintain an adequate acid strength to promote dissolution of lithium while minimizing the formation of insoluble sulfates such as calcium sulfate that can encapsulate lithium bearing materials and prevent dissolution of lithium. The sulfuric acid 203 is preferably between 90 wt % to 98 wt % sulfuric acid, and more preferably 98 wt % sulfuric acid. Preferably, the sulfate concentration in the aqueous phase ranges from about 10 g/L to 50 g/L excess sulfate.

As the slurry is treated, acid 203 is added to one or more reactors to maintain an excess sulfuric acid concentration ranging from 10 to 50 g/L in the aqueous phase; however, the ideal sulfate concentration may change based on lithium bearing slurry characteristics such as the concentration of sulfuric acid consumers such as calcium and magnesium. Water or dilute aqueous lithium solutions from downstream processing may also be added to control slurry wt. % solids in the reactor. Preferably, excess acid concentration is monitored by acid-base or thermometric titration, however other monitoring methods known in the art may be used. Preferably, slurry wt. % is monitored by radiometric sensor; however, other monitoring methods known in the art may be used. Other parameters that are used to control the lithium dissolution process in the attack tank reaction circuit include acid addition rate, filtrate recirculation rate, slurry recirculation rate, retention time, and reaction temperature. The sulfuric acid 203 addition rate ranges from 100 kg to 600 kg of sulfuric acid per dry tonne of lithium bearing fine particles feeding the attack circuit, the overall retention time ranges from 3 hours to 8 hours, the reaction temperature ranges from 20° C. to 90° C., with a preferred temperature of approximately 80° C., and wt. % solids ranges from 20 wt. % to 50 wt. %. Preferably, reaction temperature is controlled by heat transfer from steam 205. Acidic lithium bearing filtrate and acidic slurry may be recycled to the lithium dissolution circuit to increase the concentration of lithium and reduce overall acid consumption; however, lithium concentration in the aqueous phase is maintained below the solubility limit of lithium sulfate double salts, specifically, the lithium-potassium sulfate double salt.

After the ore slurry 110 is passed through a first attack tank reactor 201, where slurry temperature after acid addition is maintained at approximately 80° C., the slurry may be passed through one or more additional attack tank reactors. Variations in the operating parameters, including the amount of attack tank reactors 201 are dependent upon the characteristics of the ore slurry 110. Commercially available systems useful in this step are those such as systems manufactured by Jacobs Engineering Systems.

Pressure Filtration

Figure 3:
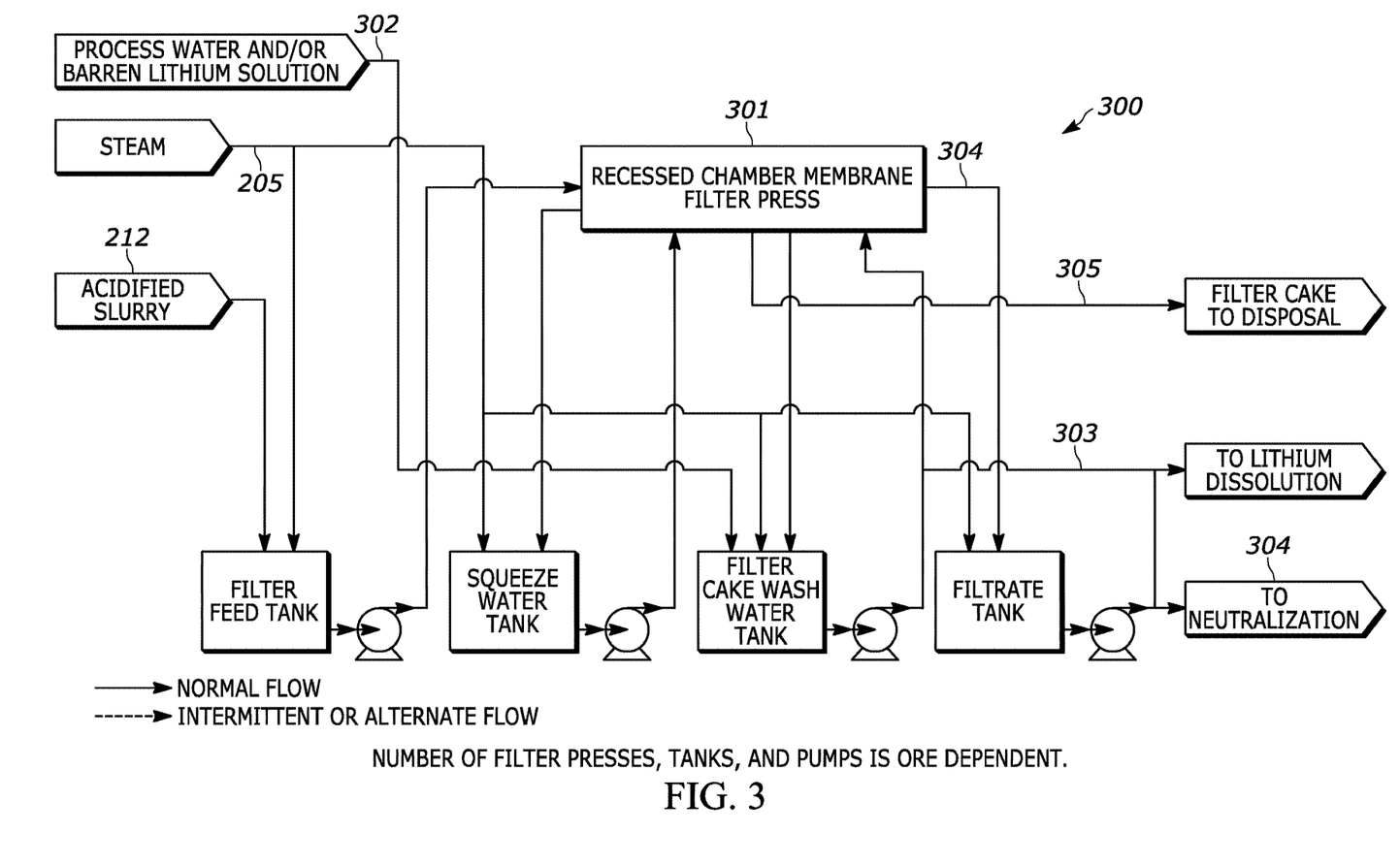
FIG. 3. is a flow chart depicting one method of separating acidic lithium solution from acidified sedimentary ore and first precipitates in accordance with one aspect of the invention.

The attack tank treatment depicted in FIG. 2 results in lithium and other components of the ore slurry 110 being dissolved in addition to gypsum being precipitated from the ore slurry 110 resulting in an acidified slurry 212. Removal of the gypsum and undissolved sedimentary ore from the acidified slurry 212 is accomplished through the use of pressure filtration 301. The pressure filtration system 300, depicted in FIG. 3, comprises tanks, pressure filters, and pumps. The number of tanks, pressure filters, and pumps is dependent on the characteristics of the sized sedimentary rock ore 101 being processed and the corresponding filtration rate of acidified slurry 212. In a preferred embodiment, the pressure filtration circuit 300 is comprised of tanks and recessed-chamber membrane filter presses operating between 50° C. and 85° C., including filter cake squeeze and filter cake wash steps. Preferably, the temperature of the acidified slurry feeding the pressure filtration circuit is controlled by heat transfer from steam 205. Other slurry filtration devices known in the art, such as various types of vacuum filters, may also be utilized.

The acidified slurry 212 is added to filter press feed tank of the pressure filtration circuit, where the slurry is heated to 82° C. if not already up to temperature as a result of processing in the lithium dissolution circuit. The acidified slurry 212 is then pumped to the recessed chamber membrane filter press until the filter press chambers are filled with filter cake. After filter press is filled with cake, the filter cake is hydraulically squeezed with hot water at a pressure ranging from 400 kPa(g) to 2,000 kPa(g), and preferably 600 kPa(g) to 1800 kPa(g). While the filter cake is squeezed, recycled water 302 from elsewhere in the process is pumped through the filter cake thereby washing residual lithium and acidity from the filter cake, FIG. 3. The resultant wash solution 303 is recycled back to the lithium dissolution circuit for lithium and acid recovery. The acidic lithium filtrate solution 304 is stored in a heated tank for further processing. The gypsum and undissolved sedimentary ore filter cake 305 is discarded.

Neutralization

Figure 4:
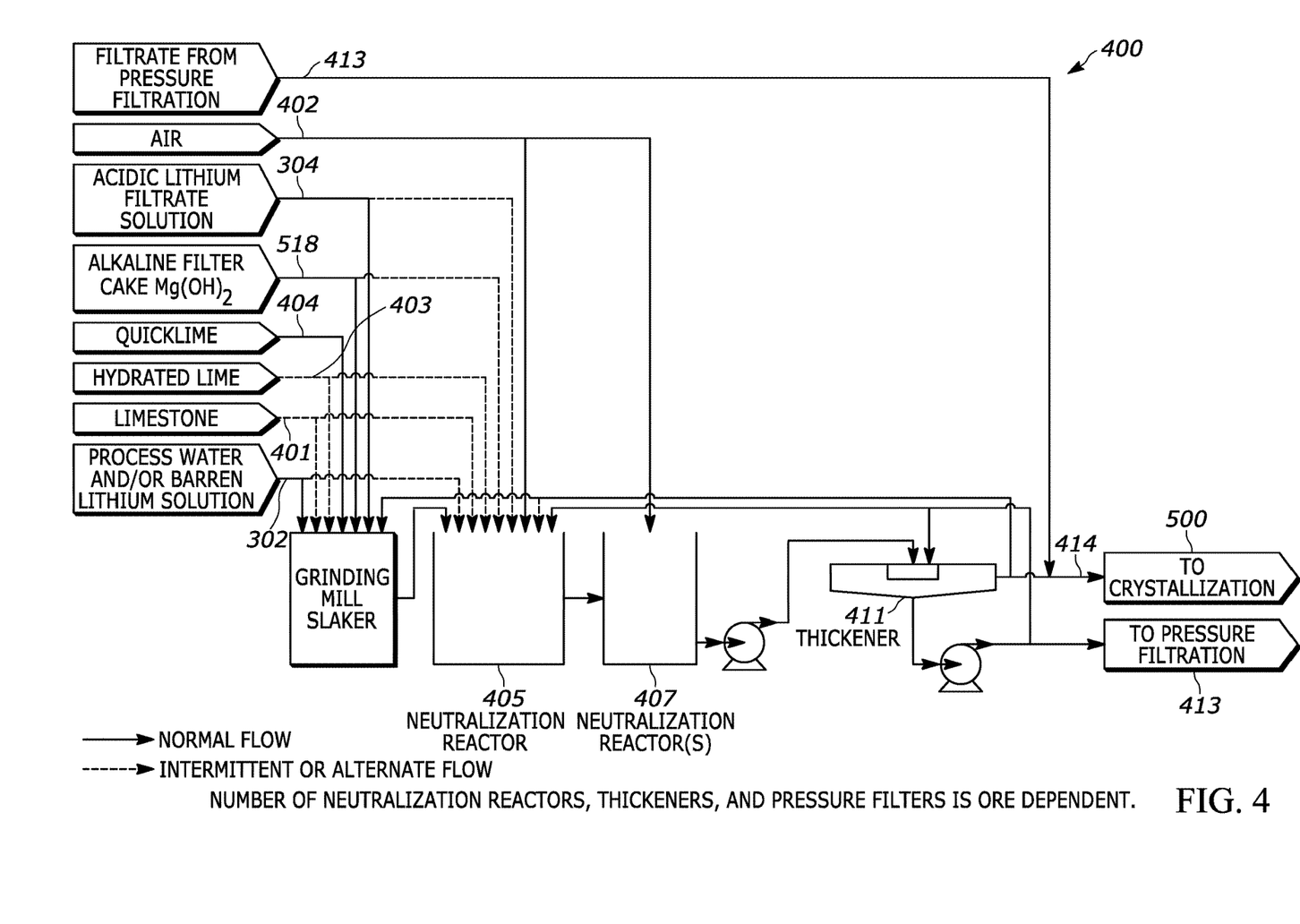
FIG. 4. is a flow chart depicting one method of neutralizing acidic lithium solution and removing second precipitates in accordance with one aspect of the invention.

The neutralization 400 of the acidic lithium filtrate solution 304 is depicted in FIG. 4. The acidic lithium filtrate solution 304 is neutralized to a pH of preferably between approximately 4 and approximately 8, and more preferably to a pH of approximately 7. Neutralization 400 may be initially accomplished by mixing limestone 401, quicklime (CaO) 404, and/or hydrated lime 403 with acidic lithium filtrate solution 300 in a neutralization reactor 405 until sufficient alkaline filter cake 518 inventory is available from the lithium sulfate brine purification circuit to accomplish neutralization. It is preferable to recycle alkaline filter cake 518 from the lithium sulfate brine purification circuit not only for the purpose of neutralization, but also to increase the concentration of magnesium in the aqueous phase of the neutralized lithium sulfate solution 414. When the neutralized lithium sulfate solution 414 is nearly saturated with magnesium, the removal of potassium as a magnesium-potassium sulfate double salt during magnesium sulfate and magnesium-potassium sulfate crystallization 501 will be maximized. If sufficient potassium is not removed as a magnesium-potassium sulfate double salt during crystallization, potassium concentration will be high enough in the mother liquor during crystallization 501 to produce a lithium-potassium sulfate double salt resulting in significant loss of lithium. After limestone 401, quicklime (CaO) 404, hydrated lime 403 and/or alkaline filter cake 518 are added to neutralization reactor 405, the neutralized slurry is then fed to one or more neutralization reactors 407 containing acidic lithium filtrate 304. In a preferred embodiment, acidic lithium filtrate 304 is combined with quicklime (CaO) 404, alkaline filter cake 518 from the lithium sulfate brine purification circuit 500, recycled water 302, and overflow from the neutralization thickener in a grinding mill lime slaker prior to being discharged to a neutralization reactor 405. The number of neutralization reactors 407 utilized is dependent on the quality of the ore that is initially mined.

As the acidic lithium filtrate 300 is neutralized, contaminants such as iron, aluminum, and manganese are precipitated from the solution. In a preferred embodiment, compressed air 402 is added to the neutralization reactors 405 and 407 to promote the oxidation and subsequent precipitation of contaminates. The contaminants are recirculated with a thickener 411 to increase solid density. The thickened slurry is purged to a pressure filtration system 413 that is similar in design and operation to the method for pressure filtration of acidified slurry 212. Pressure filtration results in the formation of a contaminants filter cake, which is washed and discarded similarly to the method for pressure filtration of acidified slurry 212. The overflow from the neutralization thickener 411 and the filtrate from pressure filtration 413 are then combined to produce a neutralized lithium sulfate solution 414 and sent to magnesium sulfate and magnesium-potassium sulfate crystallization 500 for removal of magnesium sulfate and as much potassium as possible as a magnesium-potassium sulfate salt.

Lithium Sulfate Brine Purification

Figure 5:
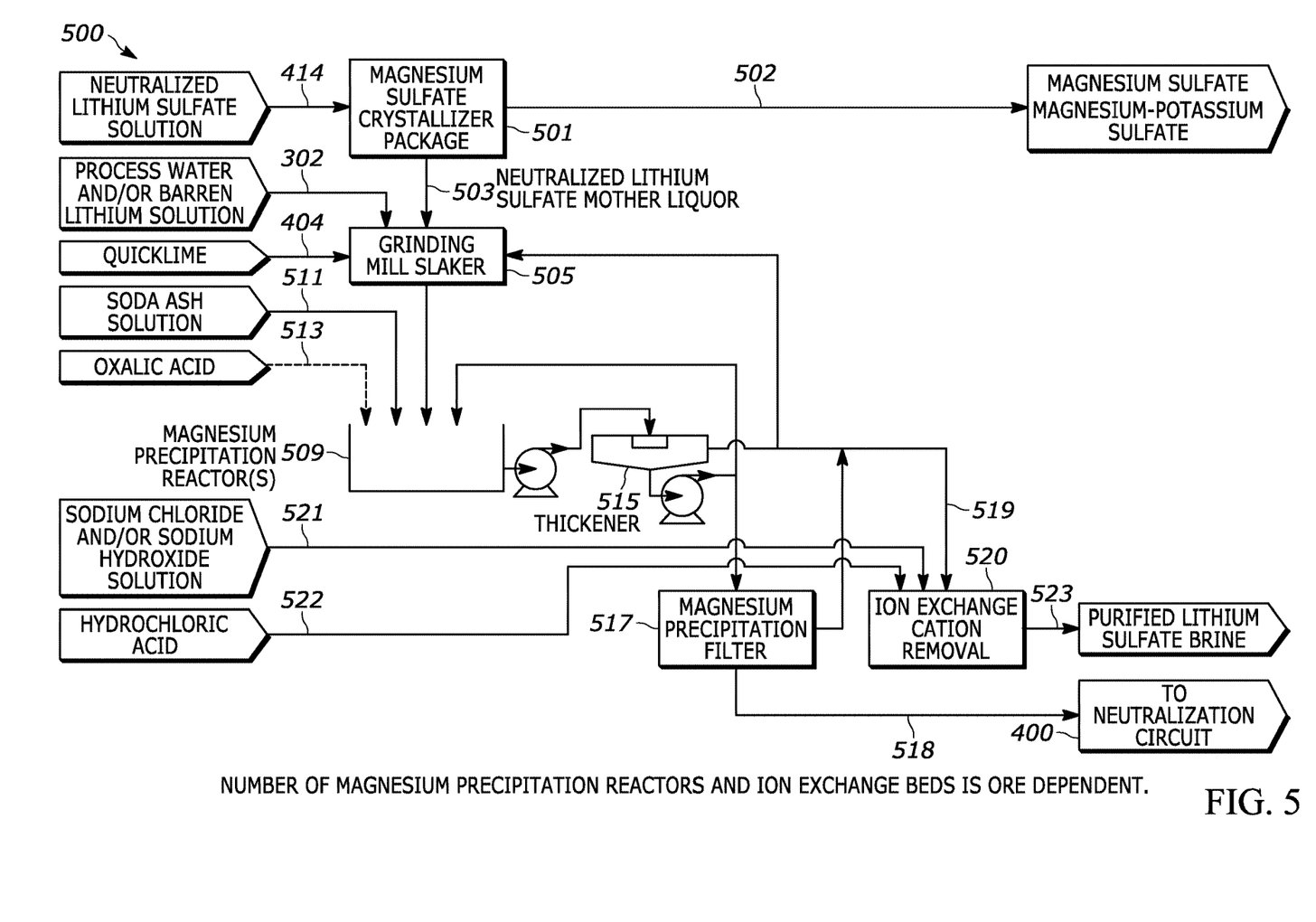
FIG. 5 is a flow chart depicting one method of purifying neutralized lithium sulfate solution and removing third precipitates in accordance with one aspect of the invention.

The crystallization of the neutralized lithium sulfate solution 414 is depicted in FIG. 5. Magnesium sulfate and magnesium-potassium sulfate is crystallized and removed from the neutralized lithium sulfate solution by packaged equipment known in the art as evaporative crystallizers 501. As a result of the crystallization, magnesium sulfate and magnesium-potassium sulfate crystals 502 are precipitated in the neutralized lithium sulfate solution 414. Included in the evaporative crystallizers package 501 is a centrifuge process and a washing stage that removes neutralized lithium sulfate mother liquor 503 from the crystals. This wash is then re-crystallized or recycled to the lithium dissolution circuit while the magnesium sulfate and magnesium-potassium sulfate crystals are discarded. Preferably, the evaporative crystallizers package 501 is operated at temperature ranging 40° C. to 60° C. and pH ranging from 6 to 8.

The resulting lithium sulfate mother liquor 503 from crystallization 501 is further processed to remove any remaining magnesium. Preferably, the mother liquor 503 is fed into a grinding mill slaker 505 where a pH modifier, preferably quicklime (CaO) 404, is added. The grinding mill slaker 505, ensures a high utilization of calcium oxide despite the presence of sulfate. In addition to quicklime (CaO) 404, overflow from the magnesium precipitation thickener 515 and recycled water 302 is also added to the grinding mill slaker 505 to facilitate the slaking process. Next, the slaked mother liquor 503 is fed into one or more magnesium precipitation reactors 509, where cation precipitating agents and pH modifiers are added to precipitate magnesium hydroxide, magnesium sulfate, calcium sulfate, calcium oxalate, and magnesium/calcium carbonates. Preferred pH modifiers include soda ash solution 511, while preferred cation precipitating agents include soda ash solution 511 and oxalic acid 513. Preferably, this results in the pH of the mother liquor 503 being increased to above 11, resulting in a mixed slurry of magnesium hydroxide, magnesium sulfate, calcium sulfate, calcium oxalate, and magnesium/calcium carbonates. The number of precipitation reactors 509 utilized is dependent on the quality of the ore that is initially mined. Similar to neutralization 400, the precipitants are recirculated with a thickener 515 to increase density of the underflow. The thickened slurry is purged to a pressure filtration system 517 (not shown) that is similar in design and operation to the method for pressure filtration of acidified slurry 212. Pressure filtration results in the formation of an alkaline filter cake 518, which is used for neutralization of acidic lithium filtrate 304. The overflow from the thickener 515 and the filtrate from pressure filtration system 517 are then combined to produce a magnesium-free lithium sulfate solution 519 that is sent to ion exchange cation removal resin beds 520.

To remove trace concentrations of divalent cations, magnesium-free lithium sulfate solution 519 is passed through a series of ion exchange cation removal resin beds 520. As the liquor is processed through the resin beds, cation contaminants not completely removed by the precipitation process such as magnesium, calcium, and iron are removed by ion exchange. The process is sequential (loading, regeneration, settling), and requires multiple resin beds operating in parallel to ensure removal of the target elements, and maintain a roughly continuous flow of finished lithium sulfate brine. Preferably, ion exchange cation removal resin beds 520 are either batch or carousel systems with a lead-lag arrangement. Preferably, the resins utilize a divinyl-benzene crosslinked microporous resin with either sulfate or a chelating group. Additionally, a sodium chloride and/or sodium hydroxide solution 521 and hydrochloric acid solution 522 may be used for resin regeneration and stripping. Contaminants removed by the ion exchange resin are discarded. The amount of pressure filters 517 and ion exchange cation removal resin beds 520 utilized is dependent on the quality of the ore that is initially mined.

The resulting purified lithium sulfate brine 523 can then be processed to multiple end products. The most commercially important end products are lithium hydroxide monohydrate and lithium carbonate. Both can be produced directly from the purified lithium sulfate brine 523 at a quality that can be used for the energy storage industry, pharmaceutical, grease, and glass industries.

Although the invention has been described by reference to its preferred embodiment as is disclosed in the specification and drawings identified above, many more embodiments of the invention are possible without departing from the invention. Thus, the scope of the invention should be limited only by the appended claims.

What is claimed is:

1. A method of extracting and concentrating lithium from sedimentary rock, said method comprising the steps of:
   suspending said sedimentary rock in an aqueous solution;
   treating said aqueous solution with acid to dissolve lithium and form first precipitates;
   filtering said aqueous solution by pressure filtration to remove said first precipitates;
   neutralizing said aqueous solution to form second precipitates and removing said second precipitates by pressure filtration;
   crystallizing said aqueous solution to form magnesium sulfate and magnesium-potassium sulfate crystals and removing said magnesium sulfate and magnesium-potassium sulfate crystals; and
   treating said aqueous solution with one or more pH modifiers and cation precipitating agents to form third precipitates and removing said third precipitates by pressure filtration, forming a purified lithium sulfate brine.

2. The method of claim 1, additionally comprising the step of sizing said sedimentary rock, wherein said sizing step comprises feeding ore to sizing equipment designed for soft ores.

3. The method of claim 2, where the sizing equipment is a rolled tooth crusher.

4. The method of claim 1, wherein said suspending said sedimentary rock in an aqueous solution step further comprises feeding said sedimentary rock to an attrition scrubber.

5. The method of claim 1, wherein said acidification of said aqueous solution comprises one or more attack tank reactors.

6. The method of claim 5, wherein said aqueous solution is fed to said attack tank reactors and is treated with sulfuric acid.

7. The method of claim 6, wherein said sulfuric acid is 90 wt % to 98 wt % sulfuric acid.

8. The method of claim 1, wherein said filtration system comprises one of more pressure filters.

9. The method of claim 1, wherein said neutralizing step further comprises feeding said aqueous solution to a neutralization reactor, wherein the pH of said aqueous solution is modified to between approximately 4 and approximately 8.

10. The method of claim 9, wherein said aqueous solution is treated with a solution comprising limestone, quicklime (CaO), hydrated lime, and magnesium hydroxide.

11. The method of claim 9, wherein said removal of said second precipitates step further comprises feeding said aqueous solution through one or more slaking mills, one or more neutralization reactors, one or more thickeners, and one or more pressure filtration systems.

12. The method of claim 1, wherein said crystallization step further comprises feeding said aqueous solution to one or more evaporative crystallizers.

13. The method of claim 12, wherein said magnesium sulfate crystals and magnesium-potassium sulfate crystals are removed by one or more centrifuges and washing devices.

14. The method of claim 1, wherein said pH modifiers comprise quicklime (CaO) and soda ash, and wherein said cation precipitating agents comprise soda ash and oxalic acid.

15. The method of claim 14, wherein said third precipitates are removed by one or more slaking mills, one or more precipitation reactors, one or more thickeners, one or more pressure filtration systems, and one or more ion exchange cation removal resin beds.

16. A method of extracting purified lithium sulfate brine from sedimentary rock, said method comprising the steps of:
    sizing said sedimentary rock;
    suspending said sized sedimentary rock in an aqueous solution;
    separating said aqueous solution into lithium bearing slurry and gangue;
    treating said lithium bearing slurry with an acid, forming first precipitates;
    separating said first precipitates and acidified sedimentary rock from said lithium bearing slurry using pressure filtration, forming an acidic lithium sulfate filtrate solution;
    modifying the pH of said acidic lithium sulfate filtrate solution to a pH of between approximately 4 and approximately 8, forming second precipitates and neutralized lithium sulfate solution;
    separating said second precipitates from said neutralized lithium sulfate solution using pressure filtration;
    crystallizing said neutralized lithium sulfate solution forming magnesium sulfate and magnesium-potassium sulfate crystals;
    separating said magnesium sulfate and said magnesium-potassium sulfate crystals from said neutralized lithium sulfate mother liquor solution;
    treating said neutralized lithium sulfate mother liquor solution with quicklime (CaO), soda ash solution, and oxalic acid forming third precipitates and magnesium-free lithium sulfate solution;
    separating said third precipitates from said magnesium-free lithium sulfate solution using pressure filtration; and
    treating said magnesium-free lithium sulfate solution with an ion exchange apparatus, forming a purified lithium sulfate brine.

* * * * *